United States Patent [19]

Zehnder

[11] Patent Number: 4,747,742

[45] Date of Patent: May 31, 1988

[54] UNLOADING FLAP FOR POURABLE PARTICULATE MATERIAL

[75] Inventor: Jürg Zehnder, Uitikon, Switzerland

[73] Assignee: Swiss Aluminium Ltd., Neuhausen, Switzerland

[21] Appl. No.: 92,560

[22] Filed: Sep. 3, 1987

[30] Foreign Application Priority Data

Sep. 22, 1986 [CH] Switzerland .......................... 3782/86

[51] Int. Cl.$^4$ .............................................. B65G 1/00
[52] U.S. Cl. ...................................... 414/299; 49/397; 105/280; 105/299; 298/35 R; 298/37; 414/519
[58] Field of Search ............. 49/397; 298/35 R, 35 M, 298/37; 414/299, 328, 329, 519; 105/284, 280, 286, 299

[56] References Cited

U.S. PATENT DOCUMENTS

| | | | |
|---|---|---|---|
| 2,365,378 | 12/1944 | Bauson | 49/397 |
| 2,456,308 | 12/1948 | O'Brien | 414/328 |
| 2,549,110 | 4/1951 | Michael | 49/397 |
| 2,836,332 | 5/1958 | Standish et al. | 298/35 R |
| 3,145,057 | 8/1964 | Taggart | 298/35 M |
| 3,220,465 | 11/1965 | Leiser | 49/397 |
| 4,278,382 | 7/1981 | Knippel | 105/280 |
| 4,366,757 | 1/1983 | Funk | 298/35 R |

Primary Examiner—Ronald C. Capossela
Attorney, Agent, or Firm—Bachman & LaPointe

[57] ABSTRACT

An unloading flap of a stationary or mobile silo for pourable particulate material having at least one outlet opening comprises an upper part that is secured to a first silo wall and a lower part that hinges on the upper part and can be tilted into the open and closed positions by means of an actuating rod that can be power driven.

The lower edge of the straight or angled lower part with respect to the upper part is in the form of a projecting support. In the closed position this support rests along a line or area on a longitudinal groove in the region of the lower edge of a second silo wall. A device attached to one of the two parts of the flap exercises a moment of rotation on the other part of the flap such that the angle ($\alpha$) between the upper and lower parts is reduced to an angle ($\alpha'$) in the open position to such an extent that during the closing operation the projecting supporting edge can be introduced into the longitudinal groove by the actuating rod acting exclusively on the upper part of the flap.

18 Claims, 2 Drawing Sheets

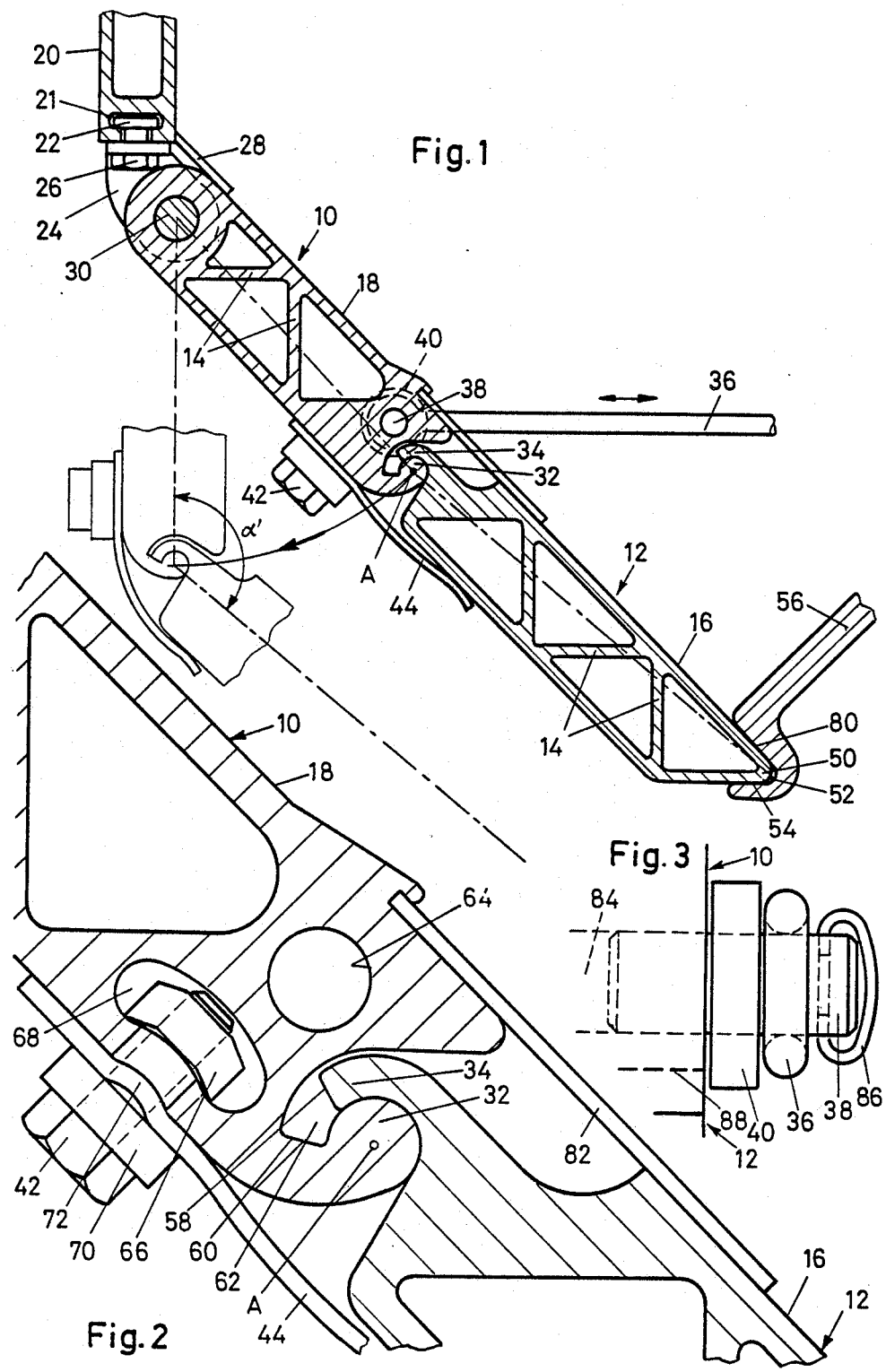

UNLOADING FLAP FOR POURABLE PARTICULATE MATERIAL

BACKGROUND OF THE INVENTION

The invention relates to an unloading flap of a stationary or mobile silo for pourable particulate material having at least one outlet opening, said unloading flap comprising an upper part that is secured to a first silo wall and a lower part that hinges on the upper part and can be tilted into the open and closed positions by means of an actuating rod that can be power driven.

Silos, both stationary and mobile silos (on lorries and railway trucks) that hold pourable particulate material must feature outlet openings that are sealed off effectively when closed, which is not simple because of the tendency for long edges to sag. Closure flaps of the conventional kind can be secured by the actuating rod only at both ends of the lower sealing edge, and must therefore be constructed such that they are extremely rigid in order that,when the flap sags under load, the gap at the sealed edge of the flap is smaller than the diameter of the particulate material. Also known, in the case of longer flaps, is to provide a plurality of securing points distributed along the length, for example 4–6 cams which are pressed against the silo wall by a camshaft. By turning the camshaft all closure means can be opened simultaneously, causing the plate to tilt into the vertical position and allowing the particulate material to run out.

Described in the U.S. Pat. No. 3,717,110 are motor driven unloading flaps for a silo type of container, in which the said flaps can be tilted towards each other into the closed position and away from each other into the open position. Each of the two flaps comprises an outer and an inner section featuring floor panels that form the silo wall when in the closed position. The individual flaps are combined by means of extrusion type components to form box-shaped construction elements.

On opening the closure flaps both parts of the same are brought from the straight into an angular position, thus exposing the silo outlet.

The lower edge of one of the two closure flaps features a tongue, and a closure plate directly adjacent and vertical to the closure flap features an opening at the end. In the closed position of the both closure flaps a locking mechanism tilts an engaging hook into the opening and fixes the other closure flap onto the tongue.

The closure mechanism and the element for actuating the closure flap are centrally actuated by a piston; as a result this makes it necessary to have a complicated lever system with numerous deflections of forces.

SUMMARY OF THE INVENTION

The object of the present invention is to develop an unloading flap for pourable particulate material of the type discussed hereinabove such that the rigidity and the weight of the flap can be reduced, less energy need be expended for actuating the flap and, because of the more favorable flap geometry and the simpler design of actuating rod, less space is required.

This object is achieved by way of the present invention in that the lower edge of the straight or angled lower part of the flap with respect to the upper part is in the form of a projecting support which in the closed position rests along a line or area in a longitudinal groove in the region of the lower edge of a second silo wall, and a device attached to one of the two parts of the flap exercises a turning moment on the other part of the flap, such that the angle between the upper and the lower parts of the flap is reduced in the open position to such an extent that during the closing operation the projecting supporting edge can be introduced into the longitudinal groove by the actuating rod acting exclusively on the upper part of the flap.

BRIEF DESCRIPTION OF THE DRAWINGS

The invention is described in greater detail in the following with the aid of the drawings, the schematic cross-sections or cross-sectioned parts or stylized representations viz;

FIG. 1: A cross-section through an unloading flap,

FIG. 2: An enlarged cross-sectional view through the region wherein the lower part of the flap is hinged to the upper part of the flap, and the means of attachment of a leaf spring.

FIG. 3: Plan view of the region of transition from the upper to lower part of the flap showing a hinge pin.

DETAILED DESCRIPTION

Figure 4:
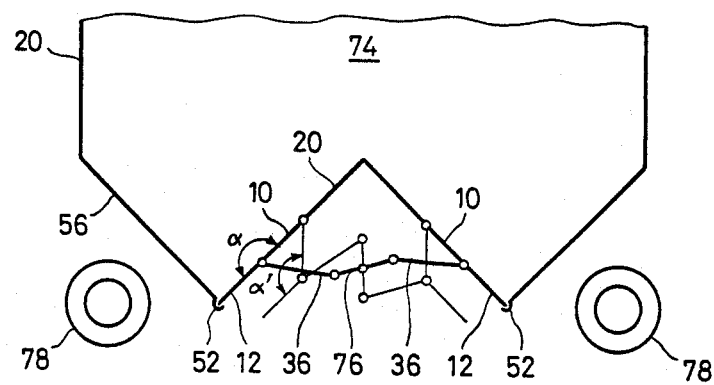
FIG. 4: A stylized side view of a road truck with a double silo running in the longitudinal direction.

The upper part of the flap can, according to the present invention, be tilted by means of a constructionally very simplified lever system. At least two to about six rods are needed depending on the length of the unloading flap. With known devices a multiple of this is necessary as further rods have to lead to the lower part of the flap and the angle between both parts is likewise set by means of actuating rods. The device according to the present invention for exercising a turning moment makes it possible to achieve this simplification which is advantageous with respect to investment and operational costs.

As with known unloading flaps an electric motor, or hydraulic or pneumatic piston is employed to drive the actuating rod. Of course the same drive facility can also actuate a plurality of unloading flaps on the same or neighboring silos.

The unloading flap can be made up of the usual components, the parts of the flap being made of injection molded hard platics or by means of extrusion. For reasons of manufacture and statics the parts of the flap are preferably made of an extruded metal, in particular aluminum or a known aluminum extrusion alloy.

An unloading flap of extruded upper and lower parts also permits simultaneous extrusion of the hinge parts that can be fitted together to provide a hinge action along the whole length. Of course the flap parts can also be joined by means of one or more hinges of a conventional design. The hinge region between both parts of the flap is preferably covered by a sealing strip or rubber strip so that, in particular in the case of fine grained particulate material, none of that material can come between sliding parts and cause damage there.

The device that reduces the angle between both parts of the flap and exercises a turning moment usefully comprises at least one leaf spring secured to the outside of one part of the flap. A groove, preferably longitudinal,into which clamping platelets can be introduced to secure the leaf spring or springs in place, is provided on the outside of the upper part of the flap.

The unloading flap cannot be introduced into the groove when in the closed position. During the closing operation, in other words during the return of the unloading flap by the actuating rods, the lower part of the flap must be at an angle to the upper part such that the projecting, supporting edge can be introduced into the longitudinal groove. This is preferably made easier by means of at least one of the following measures:

The lower part of the flap can be tilted, with respect to the upper part, up to a stop and is always held in that position by means of the device exercising the turning moment when the actuating system of rods exercises no force.

The longitudinal groove features, running in the direction of attachment to the upper part of the flap, a sliding surface along which the projecting, supporting edge is drawn into the closed position.

The unloading flap is attached in a conventional manner at the upper edge of the upper part of the flap such that it can be tilted, in the normal case on at least two upper bearing blocks which are preferably secured by clamping platelets in an undercut groove in the first silo wall.

The longitudinal opening between the silo wall and the upper part of the flap can be sealed by a cam which is part of the silo wall and extends in the form of a section tongue in the direction of the longitudinal groove in the other silo wall. In the closed position the upper part of the flap rests against the above mentioned tongue. Instead of the said tongue one could secure to the inner side of the silo wall a rubber shield which would likewise prevent particulate material from running out through the gap between the silo wall and the upper part of the flap.

The point of contact of the actuating rod to the upper part of the flap is preferably close to the hinge made with the lower part. Because of the lever effect this arrangement provides the most favorable transmission of the applied force. Usefully the upper part features a hole into which the hinge-pin can be pressed. A cylindrically shaped collar on the hinge-pin is situated above the hinge region of the lower part of the flap and prevents relative displacement of both parts of the flap in the longitudinal direction.

The unloading flap according to the present invention can rest along its whole length on a line or surface in the longitudinal groove. As a result not only is the weight of the flap and the energy required reduced, but also the tendency to leak is smaller. The simple system of actuating rods leads to a considerable reduction in the work of construction, and results in less space being required.

The unloading flap can be employed for all pourable, particulate materials in stationary or mobile silos, regardless of whether these materials are fine-grained such as alumina or cement or coarse-grained such as coke. The unloading flap is also ideally suited for grain, granulated plastic or the like.

The toggle-lever-like unloading flap shown in FIG. 1 comprises an upper part 10 and a lower part 12, both extruded aluminum sections with transverse struts 14. The outer surface 16 of the lower part 12 facing towards the inside of the silo and the outer surface 18 of the upper part 10 form, in the closed position as represented in FIG. 1, the sidewall of the silo.

The upper part 10 of the flap is mounted to the first silo wall 20. The downward pointing end face of this silo wall 20 features an undercut groove 21 that runs the whole length of the wall 20 and accepts a rhombus shaped clamping platelet 22. This platelet 22 serves to secure in place an upper bearing block 24 with the aid of a bolt 26 that is introduced into the threaded bore of the clamping platelet 22. On tightening the bolt the clamping platelet wedges itself in a conventional manner into the undercut groove 21. A flange 28 that runs in the direction of the closed unloading flap covers the region where a bolt 30 is introduced into a corresponding opening in the bearing block 24 about which region the upper part 10 of the flap can be tilted.

The lower edge region of the upper part 10 of the flap is shaped in the form of a semi-circular section 32 that runs in the longitudinal direction and forms the axis of rotation A for the lower part 12 of the flap. A hook-shaped section 34 of the lower part 12 with an inner cross-section shaped correspondingly with respect to the semi-circular section 32 is hooked in such that it can be pivoted.

The actuating rod 36 that can be moved backwards and forwards is connected to the upper part 10 of the flap via hinge pin 38 neighboring the axis A. This features a large collar 40 that is circular in cross-section and overlaps the hook-shaped section 34 of the lower part 12 of the flap, and ensures, therefor, that the lower part 12 cannot be displaced in the longitudinal direction.

Secured to the outside of the upper part 10 by means of bolts 42 is a leaf spring 44 comprising approximately 1.2 mm thick steel sheet extending over the whole length of the part 10 of the flap or the same in individual pieces. The leaf spring 44 which is the device producing the turning movement is under strong spring loading.

The lower edge of the lower part 12 of the flap is formed by a projecting supporting edge 50 that engages in the longitudinal groove 52 and rests its surface along the whole length of the flap on the supporting surface 54 of the second silo wall 56. The region of the hinge of the flap is indicated in the open position with the two parts of the flap forming between them the angle $\alpha'$.

FIG. 2 shows on a larger scale how the tilting movement of the lower part 12 of the flap takes place via its hook shaped profile 34 and the semi-circular profile 32 of the upper part 10. On opening the unloading flap the end face 58 of the hook shaped section 34 approaches the stop 60 at the end of the curved longitudinal channel 62 which is partly enclosed by the semi-circular section 32. When the end face 58 meets the stop 60 the angle between the two parts 10, 12 of the flap cannot be made smaller; the leaf spring 44 holds the lower part 12 of the flap securely in this position. Of course other surfaces suitable for a stop could also be employed here.

A C-shaped undercut groove 68 for the clamping platelets 66 is provided next to the coextruded circular bore 64 of the hinge pin 38. The clamping platelets 66 serve to secure the leaf spring 44 in place and are fixed so by a bolt 42 with a washer 70 between the head of the bolt and the spring. A centering depression or groove 72 prevents the leaf spring 44 from being displaced in the longitudinal direction.

On the inside of the silo the transition region between the upper and lower parts 10, 12 of the flap is covered by a rubber flap 82 that runs in the longitudinal direction and engages at the top in a longitudinal groove provided for that purpose.

Shown in FIG. 3 in a coextruded bore 84 in the upper part 10 of the flap is a push fit hinge-pin 38 with a collar 40 that rests against both parts 10, 12 of the flap and has a diameter twice that of the hinge pin 38. Also shown is the actuating rod 36 that connects up with the hinge pin 38 and is secured in place by a conventional end pin 86. Indicated in broken lines is the uppermost level 88 of the hook-shaped section 34 of the lower part 12 of the flap.

The double silo 74 of a road vehicle shown in FIG. 4 features two unloading flaps each with an upper part 10 and a lower part 12. The unloading flap is attached to the silo wall 20 along the saddle line of the floor. The upper and lower parts 10, 12 of the flaps are extended and form thus an angle $\alpha$ of 180°. Both unloading flaps can be actuated simultaneously via a release lever 76 which is beyond the equilibrium position when the flaps are closed. The open position is indicated by finer lines;- the angle $\alpha'$ between the upper and lower parts 10, 12 of the flap is clearly less than 180°. The wheels 78 of the vehicle show more clearly the position of the double silos which can be emptied towards the center of the vehicle.

Figure 5:
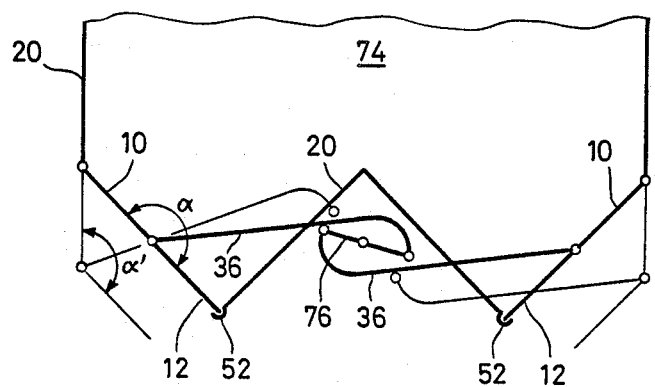
FIG. 5: A stylized end view of railway truck with a double silo running in the longitudinal direction.

In FIG. 5 the outer wall of the double silo 74 is the first silo wall 20. The upper and lower parts 10, 12, of the flap again form an angle $\alpha$ of 180° in the closed position. The railway truck, viewed from the front here, can be emptied towards the outside when the parts 10, 12 of the flap form the smaller angle $\alpha'$ as indicated by the finer lines.

The release lever 76 for simultaneously opening both flaps is again in the position beyond equilibrium. In contrast to FIG. 4 where a pulling movement is required, here the actuating rod pushes when opening the flaps.

Figure 6:
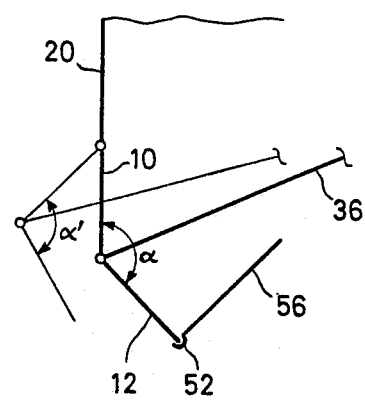
FIG. 6: A stylized unloading flap with angled upper and lower parts in the closed position.

Shown in FIG. 6 is a run-out flap with an upper part 10 and a lower part 12 which form an angle $\alpha$ of below 180° in the closed position. The open position is again indicated by fine lines, the angle $\alpha'$ being smaller than in the closed position as a result of the device that exercises a turning moment.

The operation of the unloading flap is described in the following with the aid of FIG. 1. The unloading flap is forced to form an angle, other than 180°, by a thrusting action delivered by the actuating rod 36 that applies a force to the upper part 10 of the flap. As a result the projecting support 50 is disengaged from the longitudinal groove 52, whereupon the lower part 12 of the flap is pressed down by the particulate material. The unloading flap is brought into the maximum open position by the rod 36. After the contents of the silo have been run out of it, the leaf spring 44 presses the lower part 12 of the flap in a counter clockwise direction and turns it until the end face 38 of the hook-shaped section 34 presses against the stop face 60 (FIG. 2) in the curved longitudinal channel 62. In this angled position, with angle $\alpha'$ the unloading flap is then drawn closed by the actuating rod 36 pulling on the upper part 10 of the flap. The supporting edge 50 strikes the bearing surface 80 and, by continued application of tension to the actuating rod 36, is drawn into the longitudinal groove 52 until the closed position is again reached and both parts 10, 12 form an angle of 180°.

What is claimed is:

1. Unloading flap of a stationary or mobile silo for pourable particulate having at least one outlet opening, said unloading flap comprising:

a first and second silo wall spaced from each other, wherein said second silo wall has a lower region;

an upper part secured to the first silo wall;

a lower part having a lower edge, wherein said lower part hinges on the upper part and can be tilted into the open and closed position;

actuating means operative to tilt said upper part into the open and closed position;

a longitudinal groove in the lower region of the second silo wall;

wherein, the lower edge of the lower part is in the form of a projecting support which in the closed position rests in said longitudinal groove; and means attached to one of said upper and lower parts operative to exercise a moment of rotation on the other part, such that the angle ($\alpha$) between the upper and lower parts is reduced to an angle ($\alpha'$) in the open position to such an extent that during the closing operation the projecting support can be introduced into the longitudinal groove by the actuating means acting exclusively on the upper part.

2. Unloading flap according to claim 1 wherein said actuating means is an actuating rod.

3. Unloading flap according to claim 2 including a hinge-pin for the actuating rod situated close to the axis of rotation A between the upper and lower parts of the flap.

4. Unloading flap according to claim 3 wherein said hinge-pin is pressed into a co-extruded bore.

5. Unloading flap according to claim 3 wherein the hinge-pin includes a collar overlapping the lower part of the flap.

6. Unloading flap according to claim 2 wherein in the closed position the actuating rod is in the position beyond equilibrium.

7. Unloading flap according to claim 1 wherein the upper and lower parts are extruded sections.

8. Unloading flap according to claim 7 wherein said extruded sections are of a material selected from the group consisting of aluminum and aluminum alloys.

9. Unloading flap according to claim 1 wherein the hinge connection between the upper and lower parts of the flap comprises hinge parts that extend the length of the flap, are interlocked such that they can tilt with respect to each other and are protectively covered over on the inside of the silo.

10. Unloading flap according to claim 9 wherein said protective cover is a sealing strip or rubber flap.

11. Unloading flap according to claim 1 wherein the means exercising a turning moment is at least one leaf spring that is attached to the outside of said silo.

12. Unloading flap according to claim 11 wherein said means exercising a turning moment is fixed in place by means of a clamping platelet anchored in a longitudinal groove in the upper part of the flap.

13. Unloading flap according to claim 1 wherein the lower part can be tilted with respect to the upper part up to a stop.

14. Unloading flap according to claim 1 including a means of suspension of said upper part, wherein the longitudinal groove features a sliding or bearing surface that runs approximately in the direction of the means of suspension, along which surface the projecting support slides during the closing operation until the end position is reached.

15. Unloading flap according to claim 1 wherein the upper part of the flap is suspended on at least two bearing blocks.

16. Unloading flap according to claim 15 wherein said bearing blocks are secured by means of clamping platelets in an undercut groove in the first silo wall.

17. Unloading flap according to claim 1 including a transition from the first silo wall to the upper part of the flap protected by extrusion means that is part of the silo wall and runs approximately in the direction of the longitudinal groove.

18. Unloading flap according to claim 1 including a rubber shield fixed to the silo wall running in the longitudinal direction.

* * * * *